(12) United States Patent
Yasui et al.

(10) Patent No.: US 11,876,301 B2
(45) Date of Patent: Jan. 16, 2024

(54) AUTONOMOUS RADIATION PATTERN GENERATION ANTENNA CONTROL DEVICE, CONTROL METHOD THEREFOR, AND WIRELESS COMMUNICATION SYSTEM

(71) Applicant: HITACHI KOKUSAI ELECTRIC INC., Tokyo (JP)

(72) Inventors: Satoru Yasui, Tokyo (JP); Takahito Ishii, Tokyo (JP); Keiju Ito, Tokyo (JP); Teppei Shoji, Tokyo (JP); Koji Yotsumoto, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 722 days.

(21) Appl. No.: 16/981,924

(22) PCT Filed: Mar. 20, 2018

(86) PCT No.: PCT/JP2018/011110
§ 371 (c)(1),
(2) Date: Sep. 17, 2020

(87) PCT Pub. No.: WO2019/180831
PCT Pub. Date: Sep. 26, 2019

(65) Prior Publication Data
US 2021/0135357 A1    May 6, 2021

(51) Int. Cl.
*H01Q 3/30* (2006.01)
*H04B 17/27* (2015.01)
*H04B 7/08* (2006.01)

(52) U.S. Cl.
CPC ............. *H01Q 3/30* (2013.01); *H04B 7/08* (2013.01); *H04B 17/27* (2015.01)

(58) Field of Classification Search
CPC .......... H01Q 3/30; H01Q 3/2611; H04B 7/08; H04B 17/27; H04B 7/0695; H04B 7/088
See application file for complete search history.

(56) References Cited

U.S. PATENT DOCUMENTS

2005/0053123 A1* 3/2005 Higuchi ................. H04B 7/088
375/148

FOREIGN PATENT DOCUMENTS

| JP | 2004-48753 A | 2/2004 |
| JP | 2005-86568 A | 3/2005 |
| WO | WO2011158791 A1 | 12/2011 |

OTHER PUBLICATIONS

International Search Report dated Jun. 19, 2018.

* cited by examiner

*Primary Examiner* — David E Lotter
(74) *Attorney, Agent, or Firm* — BACON&THOMAS,PLLC

(57) ABSTRACT

An antenna control device includes a weight unit in which weight values to be superimposed on transmission/reception signals are set for forming radiation patterns using a plurality of antennas and a weight synthesis unit that superposes the weight values on the transmission/reception signals. The antenna control device further includes an arrival direction detector that detects arrival directions of the reception signals, a distribution information calculator that calculates distribution information of the detected arrival directions, a signal quality calculator that calculates signal quality information of each of the radiation patterns, and a radiation pattern selector that selects a radiation pattern on the basis of the distribution information and signal quality information for the radiation patterns, and sets the weight values corresponding to the selected radiation pattern in the weight unit.

5 Claims, 11 Drawing Sheets

FIG.5
| PATTERN | -60°　　　　0°　　　　+60° |
|---|---|
| 1 | 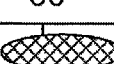 |
| 2 |  |
| 3 | 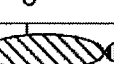 |
| 4 |  |
| 5 |  |
| 6 |  |
| 7 | 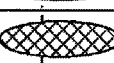 |
| 8 | 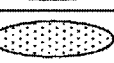 |
| 9 | 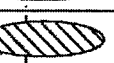 |
| 10 | 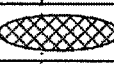 |
| 11 | 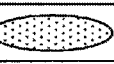 |
| 12 | 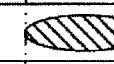 |
| 13 | 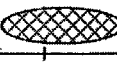 |
| 14 | 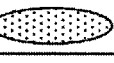 |
| 15 |  |

AUTONOMOUS RADIATION PATTERN GENERATION ANTENNA CONTROL DEVICE, CONTROL METHOD THEREFOR, AND WIRELESS COMMUNICATION SYSTEM

TECHNICAL FIELD

The present invention relates to an antenna control device that generates an antenna radiation pattern using a plurality of antennas, and more particularly, to an autonomous radiation pattern generation antenna control device that adaptively controls a radiation pattern depending on a wireless environment (radio environment), a control method therefor, and a wireless communication system (radio communication system) thereof.

BACKGROUND

<Conventional Case>

Conventionally, there is a transmission/reception device that performs communication of wireless signals using a plurality of antennas, in which weights are respectively assigned to reception signals received from the plurality of antennas, and a transmission signal is split for the antennas and the split signals are assigned with weights so that the directivity of all of the antennas can be controlled.

<Conventional Antenna Control Device: FIG. 12>

Next, a conventional antenna control device will be described with reference to FIG. 12. FIG. 12 is a block diagram illustrating a conventional antenna control device. Referring to FIG. 12, the conventional antenna control device includes an aerial line 10, a wireless unit 11, an antenna controller 100, and a modulator/demodulator 12.

The aerial line 10 includes a plurality of antennas. The wireless unit 11 is connected to the plurality of antennas of the aerial line 10 and performs transmission and reception of signals.

The antenna controller 100 is connected to the wireless unit 11 and also to the modulator/demodulator 12.

The modulator/demodulator 12 is configured to demodulate a signal received from the antenna controller 100 to output the demodulated signal to an external higher-hierarchy device and modulate a transmission signal input from the higher-hierarchy device to output the modulated signal to the antenna controller 100.

The antenna controller 100 includes a weight unit 101, a weight synthesis unit 102, and a signal coupling/splitting unit 103.

The weight unit 101 has a weight value superposed on a reception signal or a transmission signal set therein as weight information and outputs the weight value to the weight synthesis unit 102.

The weight information is information for controlling an amplitude and phase of a signal. The weight information is set in advance or is designated from a higher-hierarchy device.

The weight synthesis unit 102 is configured to superpose the weight value from the weight unit 101 on the reception signal or the transmission signal.

The signal coupling/splitting unit 103 is configured to perform synthesis by combining reception signals having weight values superposed in the weight synthesis unit 102 and output the synthesized result to the modulator/demodulator 12, and also splits a transmission signal from the modulator/demodulator 12 for the plurality of antennas and outputs the split signals to the weight synthesis unit 102.

<Partial Circuit Configuration of the Conventional Antenna Control Device: FIG. 13>

Next, a partial circuit configuration of the conventional antenna control device will be described with reference to FIG. 13. FIG. 13 is a partial circuit diagram of the conventional antenna control device.

Referring to FIG. 13, in the circuit of the conventional antenna control device, the aerial line 10 includes a plurality of antennas 10a, the wireless unit 11 includes a plurality of transceivers (TRXs) 11a and a plurality of analog digital/digital analog (AD/DA) converters 11b, and the weight synthesis unit 102 includes a plurality of multipliers 102a.

In the following description, operations of the circuit of FIG. 13 are divided into reception processing and transmission processing.

First, in the reception processing, radio waves arriving at the aerial line 10 are input to respective antennas 10a, the input radio waves are received by the TRXs 11a of the wireless unit 11, the received radio waves are converted from analog signals to digital signals by the AD/DA converters 11b, and the digital signals are output to the antenna controller 100.

In the antenna controller 100, the signals output from the AD/DA converters 11b of the wireless unit 11 are multiplied (superposed) by weight values from the weight unit 101 by the multipliers 102a of the weight synthesis unit 102, respectively, and the multiplied signals are combined (synthesized) by the signal coupling/splitting unit 103 and then the combined signal output to the modulator/demodulator 12.

In the transmission processing, a signal modulated by the modulator/demodulator 12 is distributed (split) by the signal coupling/splitting unit 103 and the distributed signals output to respective multipliers 102a of the weight synthesis unit 102.

The distributed signals are multiplied (superposed) by weight values from the weight unit 101 by the multipliers 102a, respectively, and the multiplied signals are output to the AD/DA converters 11b of the wireless unit 11 to be converted from digital signals to analog signals. The converted analog signals are converted and amplified into radiation signals by the TRXs 11a and then output from the antennas 10a of the aerial line 10, respectively.

The antenna control device shown in FIG. 12 is configured to control one radiation pattern for one higher-hierarchy device such as a base station and is provided to improve the quality of communication and used to prevent interference with surrounding areas.

In recent years, beam control technology is being actively developed to efficiently track a moving object. However, since the number of beams that can be generated with one radiation pattern is limited depending on the number of antennas, the conventional fixed beam control is employed in a communication environment having a large number of moving objects.

RELATED ART

In addition, as a related art, there is Japanese Patent Application Publication No. 2004-048753 "Sector Antenna Device" (Patent Document 1).

Patent Document 1 discloses a sector antenna device that forms a sector having directivity and performs wireless communication with a mobile station in the sector, in which the directivity of the sector varies according to a communication situation with the mobile station.

Patent Document

Patent Document 1: Japanese Patent Application Publication No. 2004-048753.

However, it is difficult for the conventional antenna control device to set a radiation pattern of an antenna for the following reasons.

First, in the conventional antenna control device, when an antenna radiation pattern is fixedly directed to a plurality of areas, there is a demand to determine appropriate weight values through prior investigation for each wireless environment, and it is not easy to set a radiation pattern.

Second, for example, in a mobile system in which a number of mobile radio devices exist in an area, it is preferable for a base station to form a radiation pattern according to the ratio of the mobile radio devices per area. However, the ratio of the mobile radio devices greatly varies with each setting environment of the base station. The conventional antenna control device has a difficulty in setting the radiation pattern corresponding to the mobile radio devices.

Third, in the mobile system, when it is assumed that the surrounding environment changes over time and the ratio of the mobile radio devices changes, the radiation pattern with initially set weight values may not be continuously used as an appropriate radiation pattern for a long period of time, which requires periodic adjustment from a higher-hierarchy device, and has a limitation of requiring resetting of the radiation pattern.

Fourth, a wireless environment in which beams are generated from a radiation pattern covers a large number of users, and even when the capacity of the wireless side is increased by allowing beams to be directed to a plurality of areas, the system may not be provided with efficient communication quality due to a limitation of the capacity of the higher-hierarchy device.

The present invention has been proposed in view of the above limitations and provides an autonomous radiation pattern generation antenna control device, a control method therefor, and a wireless communication system thereof that are capable of generating a plurality of autonomous radiation patterns by setting weight values so as to generate an appropriate radiation pattern in a plurality of areas according to a wireless environment.

SUMMARY

In accordance with an aspect of the present invention, there is provided an antenna control device including a weight unit in which weight values to be superposed on transmission/reception signals are set to form radiation patterns using a plurality of antennas and a weight synthesis unit configured to superpose the weight values on the transmission/reception signals, the antenna control device including: an arrival direction detector configured to detect arrival directions of the reception signals; a distribution information calculator configured to calculate distribution information of the detected arrival directions; a signal quality calculator configured to calculate signal quality information of each of the radiation patterns; and a radiation pattern selector configured to select a radiation pattern on a basis of the distribution information and the signal quality information and set the weight values corresponding to the selected radiation pattern in the weight unit.

In the antenna control device, the arrival direction detector may repeat a process of estimating angles of the arrival directions of the reception signals a specific number of times. The distribution information calculator may accumulate information related to reception levels at the angles of the arrival directions of the reception signals estimated through the repeated estimation and calculate distribution information of the arrival directions of the radio waves from the accumulated information. The signal quality calculator may calculate signal quality information of each of candidates for the radiation pattern. Further, the radiation pattern selector may select the radiation pattern among the candidates on the basis of a score obtained by superposing the distribution information of the arrival directions on each of the candidates for the radiation pattern according to the signal quality information.

In the antenna control device, the radiation pattern selector may select, among the candidates, the radiation pattern that has a highest score obtained by superposing the distribution information of the arrival directions on each of the candidates for the radiation pattern and performing summation on each of the distribution information superposed candidates.

In the antenna control device, the radiation pattern selector may selects, among the candidates, the radiation pattern that has a highest value obtained by adding to the score a magnitude of a variance of sub-scores for respective beams in each of the candidates for the radiation pattern.

In the antenna control device, the plurality of antennas may be polarization-shared antennas and each of a vertical polarized radiation pattern and a horizontal polarized radiation pattern may be selected.

In accordance with another aspect of the present invention, there is provided a method of controlling an antenna control device including a weight unit in which weight values to be superposed on transmission/reception signals are set to form radiation patterns using a plurality of antennas and a weight synthesis unit configured to superpose the weight values on the transmission/reception signals, the method including: detecting arrival directions of the reception signals; calculating distribution information of the detected arrival directions; calculating signal quality information of each of the radiation patterns; and selecting a radiation pattern on the basis of the distribution information and the signal quality information and setting the weight values corresponding to the selected radiation pattern in the weight unit.

In the method of controlling the antenna control device, a process of estimating angles of the arrival directions of the reception signals may be repeated a specific number of times in the detecting of the arrival direction. Information related to reception levels at the angles of the arrival directions of the reception signals estimated through the repeated estimation may be accumulated and distribution information of the arrival directions of the radio waves may be calculated from the accumulated information in the calculating of the distribution information. Signal quality information of each of candidates for the radiation pattern may be calculated in the calculating of the signal quality information. Further, the radiation pattern may be selected among the candidates on a basis of a score obtained by superposing the distribution information of the arrival directions on each of the candidates for the radiation pattern according to the signal quality information in the selecting of the radiation pattern.

In the method of controlling the antenna control device, in the selecting of the radiation pattern, the radiation pattern that has a highest score obtained by superposing the distribution information of the arrival directions on each of the candidates for the radiation pattern and performing summation on each of the distribution information superposed candidates may be selected among the candidates.

In the method of controlling the antenna control device, in the selecting of the radiation pattern, the radiation pattern that has a highest value obtained by adding to the score a magnitude of a variance of sub-scores for respective beams in each of the candidates for the radiation pattern may be selected.

In the method of controlling the antenna control device, the plurality of antennas may be polarization-shared antennas and each of a vertical polarized radiation pattern and a horizontal polarized radiation pattern may be selected.

In accordance with still another aspect of the present invention, there is provided a wireless communication system including: the antenna control device described above; and a plurality of higher-hierarchy devices. The number of weight units and the number of weight synthesis units are the same as the number of the higher-hierarchy devices, and coupling/splitting units are provided between the weight synthesis units and the higher-hierarchy devices, respectively.

Effect of the Invention

In accordance with the present invention, there is provided an antenna control device including a weight unit in which weight values to be superposed on transmission/reception signals are set to form radiation patterns using a plurality of antennas and a weight synthesis unit configured to superpose the weight values on the transmission/reception signals, the antenna control device including: an arrival direction detector configured to detect arrival directions of the reception signals; a distribution information calculator configured to calculate distribution information of the detected arrival directions; a signal quality calculator configured to calculate signal quality information of each of the radiation patterns; and a radiation pattern selector configured to select a radiation pattern on a basis of the distribution information and the signal quality information and set the weight values corresponding to the selected radiation pattern in the weight unit. Therefore, it is possible to easily set the weight values so that an appropriate radiation pattern for a plurality of areas is autonomously generated according to a wireless environment.

BRIEF DESCRIPTION OF THE DRAWINGS

FIG. 5 shows an example of a combination of radiation patterns when a plurality of higher-hierarchy devices are provided.

DETAILED DESCRIPTION

Embodiments of the present invention will be described with reference to the accompanying drawings.

Overview of Embodiments

An autonomous radiation pattern generation antenna control device (an antenna control device) according to an embodiment of the present invention includes a weight unit in which weight values to be superposed on transmission/reception signals are set to form radiation patterns using a plurality of antennas, a weight synthesis unit configured to superpose the weight values from the weight unit on the transmission/reception signals, an arrival direction detector configured to detect arrival directions of the reception signals, a distribution information calculator configured to calculate distribution information of the detected arrival directions, a signal quality calculator configured to calculate signal quality information of each of the radiation patterns, and a radiation pattern selector configured to select a radiation pattern on the basis of the distribution information and the signal quality information of each of the radiation patterns and set the weight values corresponding to the selected radiation pattern in the weight unit. With such configuration, the weight values may be easily set so that an appropriate radiation pattern for a plurality of areas is autonomously generated according to a wireless environment.

Figure 1:
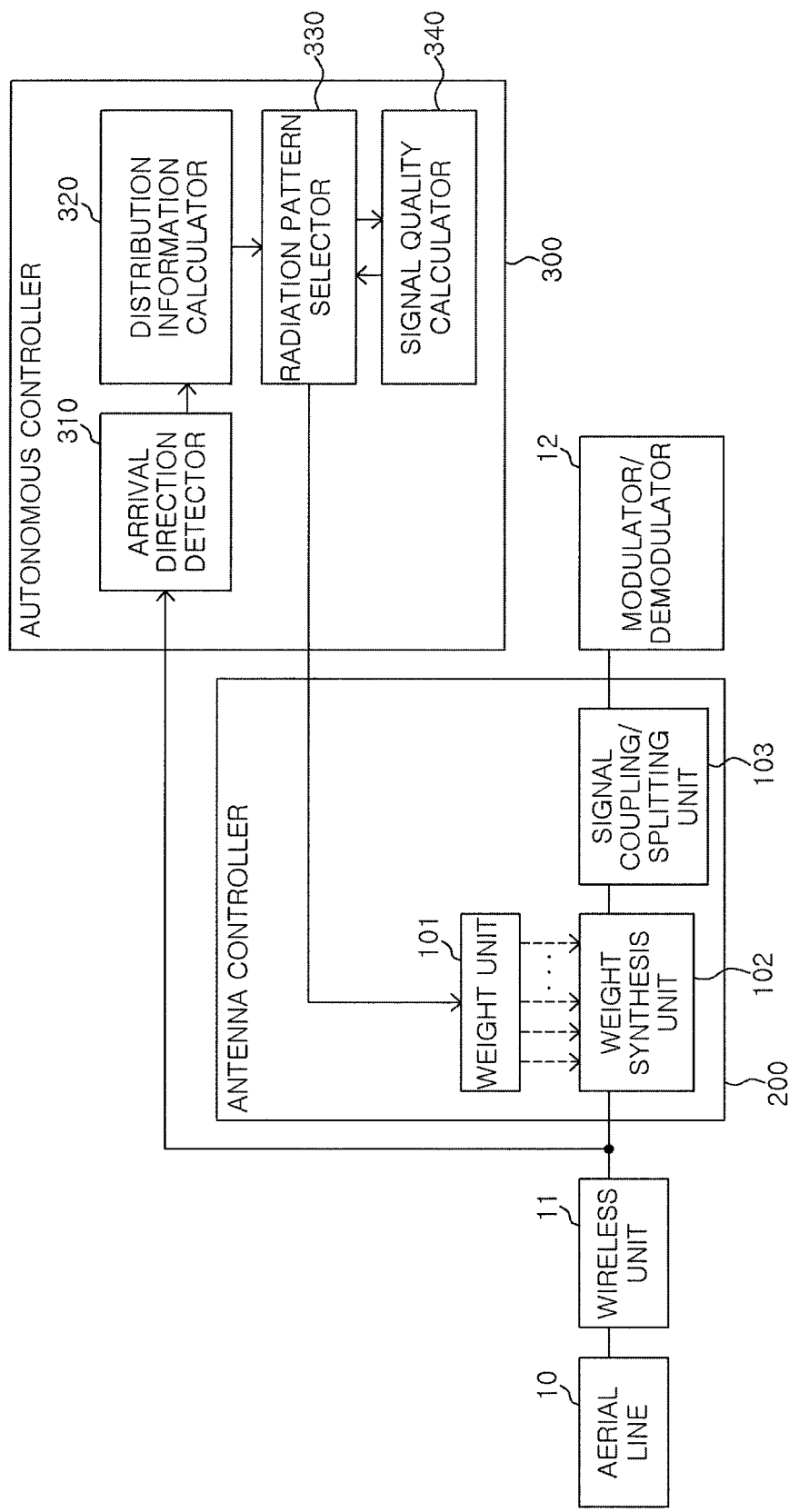
FIG. 1 is a block diagram showing a configuration of an antenna control device according to the embodiment.

<Configuration of the Antenna Control Device: FIG. 1>

An antenna control device for generation of a plurality of autonomous radiation patterns according to an embodiment of the present invention will be described with reference to FIG. 1. FIG. 1 is a block diagram showing a configuration of the antenna control device.

As shown in FIG. 1, the antenna control device basically includes an aerial line 10, a wireless unit 11, an antenna controller 200, a modulator/demodulator 12, and an autonomous controller 300.

The modulator/demodulator 12 connected to the antenna controller 200 is also connected to a higher-hierarchy device.

Figure 12:
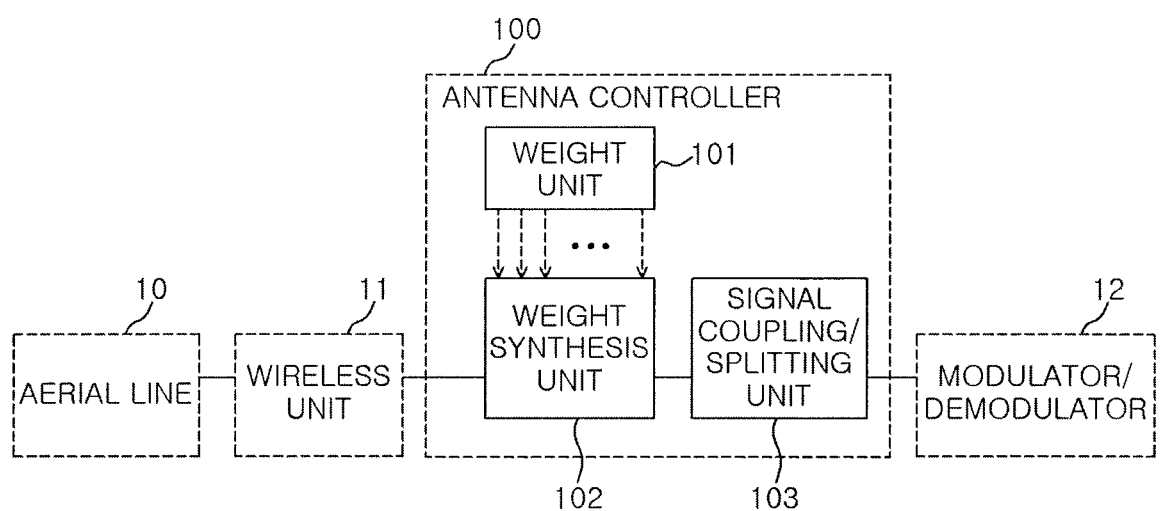
FIG. 12 is a block diagram illustrating a configuration of a conventional antenna control device.
Figure 13:
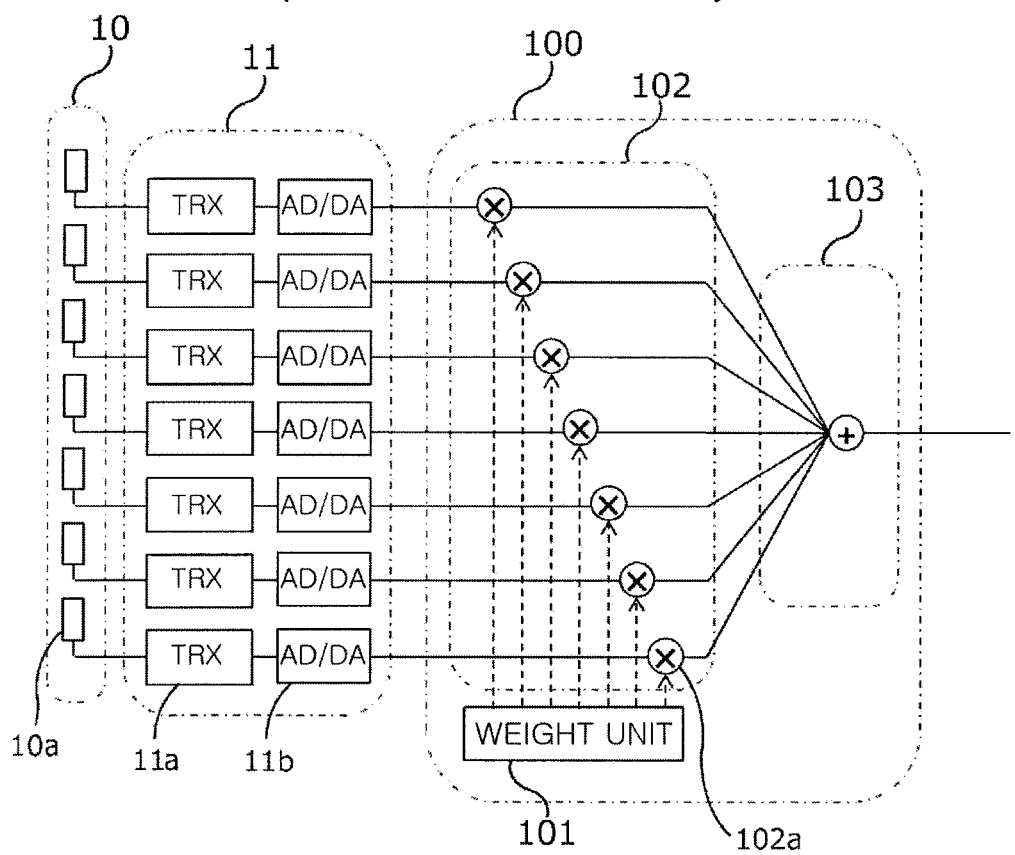
FIG. 13 is a partial circuit diagram of the conventional antenna control device.

In addition, the aerial line 10, the wireless unit 11, and the modulator/demodulator 12 are substantially the same as those of the conventional configuration shown in FIGS. 12 and 13, and thus descriptions thereof will be omitted.

<Units of the Antenna Control Device>

Units of the antenna control device, in particular, the antenna controller 200 and the autonomous controller 300, will be described in detail.

The antenna controller 200 is configured to superpose weight values from the autonomous controller 300 on transmission/reception signals.

Specifically, the antenna controller 200 superposes weight values on reception signals input from the wireless unit 11, combines (synthesizes) the weight value superposed signals, and outputs the combined signal to the modulator/demodulator 12, and the antenna controller 200 splits (distributes) a transmission signal input from the modulator/demodulator 12, superposes weight values on the split signals, and outputs the weight value superposed signals to the wireless unit 11.

The autonomous controller 300 is configured to estimate angles of arrival directions (direction-of-arrival) of the reception signals, estimate the distribution of arrival directions of radio waves from information about reception levels at the angles, generate candidates for a radiation pattern from information about the distribution, calculates the communication qualities of the candidates, select a radiation pattern corresponding to the distribution information from the candidates on the basis of the communication qualities, and output weight values for forming the radiation pattern to the weight unit 101 of the antenna controller 200.

<Antenna Controller 200>

Next, a configuration of the antenna controller 200 will be described.

The antenna controller 200 includes a weight unit 101, a weight synthesis unit 102, and a signal coupling/splitting unit 103.

<Weight Unit 101>

The weight unit 101 has a weight value designated (input) from the autonomous controller 300 set therein and is configured to output the weight value to the weight synthesis unit 102.

<Weight Synthesis Unit 102>

The weight synthesis unit 102 is configured to superpose the weight value on the reception signal from each antenna input from the wireless unit 11 and output the weight value superposed reception signal to the signal coupling/splitting unit 103.

Further, the weight synthesis unit 102 is configured to superpose the weight value on the transmission signal from the signal coupling/splitting unit 103 and output the weight value superposed transmission signal to the wireless unit 11.

That is, the weight synthesis unit 102 superposes the weight values on the reception signals and the transmitted signal.

<Signal Coupling/Splitting Unit 103>

The signal coupling/splitting unit 103 is configured to combine reception signals having weight values superposed by the weight synthesis unit 102 and output the combined signal to the modulator/demodulator 12.

Further, the signal coupling/splitting unit 103 distributes (splits) a transmission signal from the modulator/demodulator 12 and then output the split signals to the weight synthesis unit 102.

<Autonomous Controller 300>

Next, a configuration of the autonomous controller 300 will be described.

The autonomous controller 300 includes an arrival direction detector 310, a distribution information calculator 320, a radiation pattern selector 330, and a signal quality calculator 340.

<Arrival Direction Detector 310>

The arrival direction detector 310 is configured to receive a reception signal of each antenna from the wireless unit 11 and estimate an angle of an arrival direction of the reception signal (direction-of-arrival estimation). Information about a reception level at each angle for which the direction-of-arrival estimation has been performed is output to the distribution information calculator 320.

The direction-of-arrival estimation of the arrival direction detector 310 is performed at specific time intervals.

Here, the direction-of-arrival estimation may be achieved by known methods. A method of forming a directional pattern using an antenna and scanning the pattern in an angle of direction (beamforming method), a modified beamforming method by Capon (Capon method), and a method of forming a null pattern using an antenna and scanning the pattern in an angle of direction (a linear prediction method), and a multiple signal classification (MUSIC) method may be preferably used.

In the linear prediction method, specifically, a threshold value is set for reception signals input by scanning such that only a signal at a high reception level is used, and a signal at a reception level higher than the threshold value is output to the distribution information calculator 320.

Alternatively, other known methods may be used as long as they are methods in which the algorithms converge within a time interval of the arrival direction estimation performed by the arrival direction detector 310.

<Distribution Information Calculator 320>

The distribution information calculator 320 is configured to receive information about a reception level at each angle from the arrival direction detector 310, accumulate (add) the information about the reception levels a specific number of times by which the arrival direction estimation is repeated, estimate the distribution of arrival directions of radio waves from the accumulated information (statistical information), and output the estimated distribution information of the arrival directions (distribution information of direction-of-arrival estimation) to the radiation pattern selector 330.

Here, the distribution information calculator 320 may receive the information about the reception level at each angle from the arrival direction detector 310, accumulate, among the information about the reception levels received a specific number of times by which the arrival direction estimation is repeated, information about an angle at which the information about the reception level has a peak greater than or equal to a specific level (+10 decibels of a noise level), and output a kernel distribution of the accumulated information (distribution information of direction-of-arrival estimation) to the radiation pattern selector 330.

The kernel distribution y is preferably provided using a Gaussian function and may be obtained by Equation 1 as follows:

⟨Equation 1⟩

$$y(\theta) = \frac{1}{Nh}\sum_{i}^{N}\frac{1}{\sqrt{2\pi}}\exp\left(-\frac{1}{2}\left(\frac{\theta - \theta_i}{h}\right)^2\right) \quad (1)$$

where $\theta$ is an angle, $\theta_i$ is a peak angle of an $i^{th}$ arrival direction estimation, N is the total number of peaks, and h is a parameter for smoothing.

The kernel distribution may be determined by other known methods.

That is, the distribution information calculator 320 calculates the frequency of receptions at the arrival angle as statistical information and obtains the distribution information of direction-of-arrival estimation based on the statistical information.

In addition, the distribution information calculator 320 is provided to reset the accumulated information about the reception levels at a specific timing to follow a change of a wireless environment and estimate the distribution of the arrival directions corresponding to the latest wireless environment.

The specific timing refers to a time interval longer than the time interval of the direction-of-arrival estimation, or a time when a part where the frequency of arrivals is high (a peak of the frequency of arrivals) deviates from a specific angle (e.g., five degrees). In addition, in a multi-path environment where a large number of reflections exist, such as indoor environments, and a large number of paths are received from the same wave source, the distribution information calculator 320 is configured to calculate a cross-correlation between paths received at the same timing in a process of determining a distribution of the arrival directions to identify a correlation, determine a signal having a high correlation as a multi-path signal from the same wave source, and store only a maximum path of the multi-paths as the arrival direction in statistical information.

<Radiation Pattern Selector 330>

The radiation pattern selector 330 is configured to output radiation patterns serving as candidates to the signal quality calculator 340. The plurality of candidates for the radiation pattern are prepared in advance (for example, fifteen types of candidates shown in FIG. 5) in the device. Alternatively, a candidate for a radiation pattern may be provided to have one initial value for the weight values for forming the radiation pattern or have random initial weight values and then the weight values are updated according to the learning of the rear stage.

In addition, the radiation pattern selector 330 is configured to receive the distribution information of direction-of-arrival estimation from the distribution information calculator 320, receive signal quality information of each of the candidates for the radiation pattern from the signal quality calculator 340, select the radiation pattern corresponding to the distribution information among the candidates for the radiation pattern on the basis of the distribution information and the signal quality information of the radiation patterns, and output weight values for forming the radiation pattern to the weight unit 101 of the antenna controller 200.

The selection of the radiation pattern corresponding to the distribution information is performed by superposing the distribution information on each of the candidates for the radiation pattern and performing summation on each of the distribution information superposed candidates to calculate a score and selecting a radiation pattern having the highest score.

From the distribution information and the maximum value selection (max pooling) of an $i^{th}$ radiation pattern candidate, a score t can be obtained by Equation 2 as follows:

⟨Equation 2⟩

$$t_i = \sum_\theta p(\theta) \times \max(q_{i,Beam1}(\theta), q_{i,Beam2}(\theta), \ldots q_{i,BeamN}(\theta)) \quad (2)$$

where p is distribution information, q is the signal quality of beam in the radiation pattern, and N is the number of beams in the radiation pattern.

In addition, for the method of obtaining a score, a noise level (e.g., minus 30 decibels) may be specified as in Equation 3 that is expressed as follows:

⟨Equation 3⟩

$$t_i = \sum_\theta p(\theta) \times \min(\max(q_{i,Beam1}(\theta), q_{i,Beam2}(\theta), \ldots q_{i,BeamN}(\theta)), 10^{30/10}). \quad (3)$$

Further, for the method for obtaining a score, a phenomenon that a difference in influence on data throughput is eliminated at a level below a specific signal quality (e.g., 1.5 decibels) is applied as in Equation 4 that is expressed as follow:

⟨Equation 4⟩

$$t_i = \sum_\theta p(\theta) \times \max(q_{i,Beam1}(\theta), q_{i,Beam2}(\theta), \ldots q_{i,BeamN}(\theta), 10^{1.5/10}). \quad (4)$$

Alternatively, in the method of obtaining a score, a nonlinear function may be applied to a rear stage of the max pulling on the radiation pattern candidate, and particularly, a sigmoid function may be preferable for improving the communication quality.

The magnitude of a variance of sub-scores for respective beams in the radiation pattern may be added to the score as an indicator. Each sub-score st may be obtained, for example, by Equation 5 as follows:

⟨Equation 5⟩

$$st_{i,Beamj} = \sum_\theta p(\theta) \times q_{i,Beamj}(\theta). \quad (5)$$

The magnitude my of the variance of the sub-scores indicates the capacity and may be obtained, for example, by Equation 6 as follows:

⟨Equation 6⟩

$$mv_i = -\frac{1}{M}\sum_j^M \left( st_{i,Beamj} - \frac{1}{M}\sum_j^M st_{i,Beamj} \right)^2 \quad (6)$$

where M is the number of beams.

That is, a score ti is obtained as the sum of Equation (2) and Equation (6) (Equation (2)+Equation (6)), that is, a score having the magnitude my of the variance of the sub-scores added thereto, and a radiation pattern having the highest score ti is selected. In addition, as for the magnitude of the variance, a monotonically decreasing function may be preferable.

Thus, the reason the magnitude of the variance of the sub-scores is added to the score is that there is a possibility that distribution of users is covered by only a specific beam when the evaluation is performed only with the score. Since each beam has a limited capacity, sufficient performance may not be provided. Accordingly, the sub-scores of the beams are calculated and learning is performed to cause the sub-scores to be equal so that the number of beams having the capacity is increased and the overall capacity is improved.

The weight values based on the selected radiation pattern are calculated by an algorithm of weight calculation. Alternatively, a combination of weight values for antennas may be stored in a storage medium of the radiation pattern selector 330 in association with radiation patterns in advance, and the weight values may be selected by being compared to the corresponding radiation pattern.

<Signal Quality Calculator 340>

The signal quality calculator 340 is configured to receive radiation patterns from the radiation pattern selector 330, calculate the signal qualities of the radiation patterns, and output the signal qualities of the radiation patterns to the radiation pattern selector 330.

The signal quality calculator 340 obtains the signal quality by outputting a level ratio (signal to interference plus noise ratio: SINR) of a beam (signal beam) of a target radiation pattern to other beams (interference beams) and noise.

The SINR of an $i^{th}$ beam may be obtained by Equation 7 as follows:

⟨Equation 7⟩

$$SINR_i(\theta) = \frac{P_i(\theta)}{\sum_{j \neq i} P_j(\theta) + N} \quad (7)$$

where P is a signal level and N is a noise level.

For the signal quality, a signal to interference ratio (SIR) and signal to noise ratio (SNR) may be used. In addition, an index of a known signal quality may be used.

Figure 2:
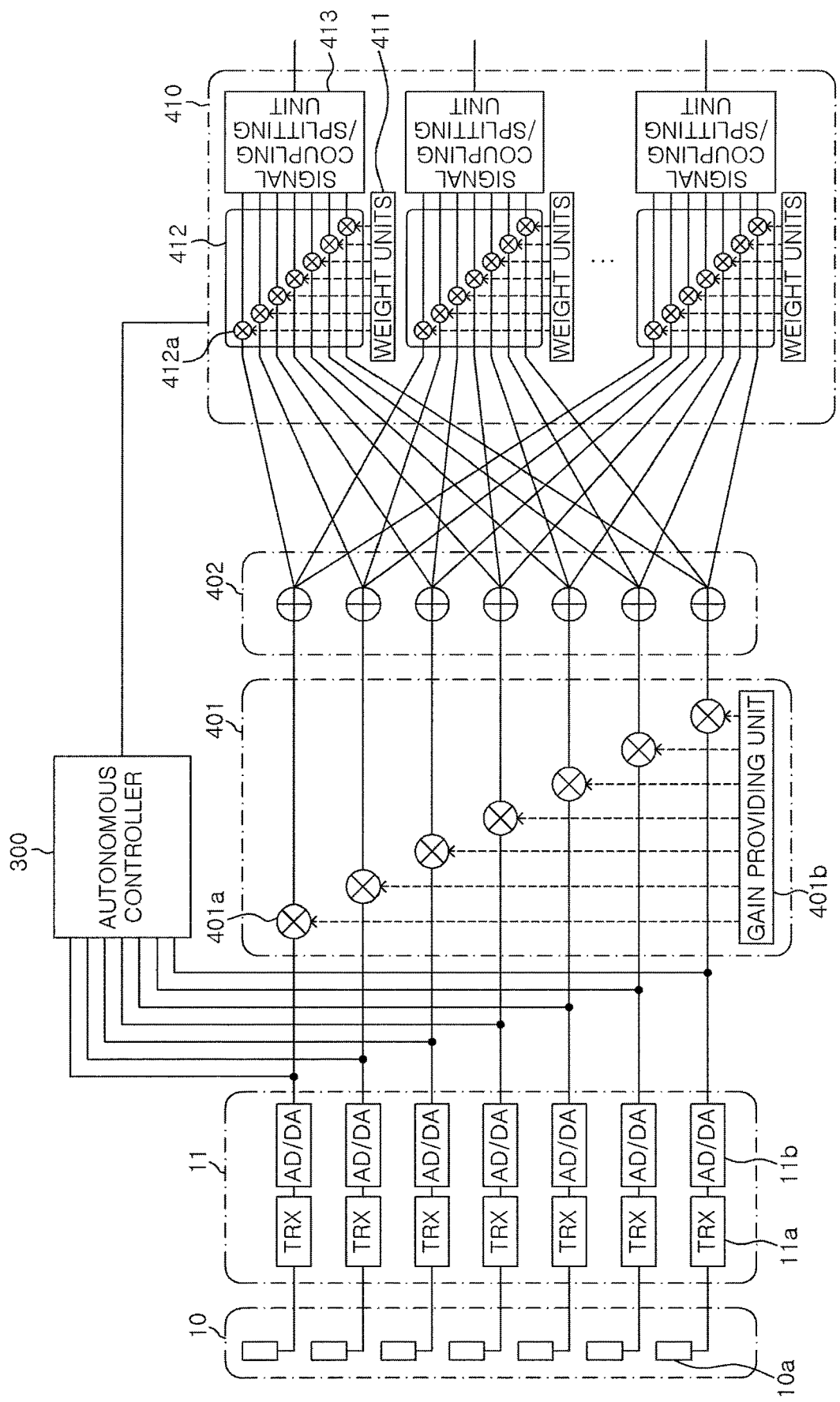
FIG. 2 is a partial circuit diagram of the antenna control device according to the embodiment with a plurality of higher-hierarchy devices.

<Circuit Configuration of Antenna Control Device According to the Present Invention with a Plurality of Higher-Hierarchy Devices: FIG. 2>

Next, a partial circuit configuration of the antenna control device according to the present invention with a plurality of higher-hierarchy devices will be described with reference to FIG. 2. FIG. 2 is a partial circuit diagram of the antenna control device according to the present embodiment with a plurality of higher-hierarchy devices.

In the configuration of FIG. 2, an antenna controller 410 with only one higher-hierarchy device includes one weight unit 411, one weight synthesis unit 412, and one signal coupling/splitting unit 413.

The antenna control device according to the embodiment and the higher-hierarchy devices are integrated to form a wireless communication system according to the present embodiment.

In the configuration of FIG. 2, even in a wireless environment where the capacity of a higher-hierarchy device reaches the limit first due to a large number of users, each beam is connected to a different higher-hierarchy device, so that a sufficient capacity is provided and deterioration of the communication quality is suppressed.

As illustrated in FIG. 2, the antenna control device according to the present embodiment includes the aerial line 10, the wireless unit 11, a gain normalization unit 401, a higher-hierarchy device coupling/splitting unit 402, and an antenna controller 410.

In addition, the weight unit 411 of the antenna controller 410 is provided with an interface for inputting weight values from the autonomous controller 300, but a description thereof is omitted.

The aerial line 10 and the wireless unit 11 are the same as those described with reference to FIGS. 12, 13, and 1.

A plurality of TRXs 11a of the wireless unit 11 are respectively connected to a plurality of antennas 10a of the aerial line 10, and the TRXs 11a are connected to the autonomous controller 300 and the gain normalization unit 401 through a plurality of AD/DAs 11b.

The autonomous controller 300 is configured to receive respective outputs from the AD/DAs 11b of the wireless unit 11. Details of the autonomous controller 300 are the same as those described in FIG. 1.

<Gain Normalization Unit 401>

The gain normalization unit 401 is configured to adjust transmission/reception signals to appropriate levels and includes multipliers 401a connected to the AD/DAs 11b, and a gain providing unit 401b configured to provide gains to the multipliers 401a, and the gains from the gain providing unit 401b are superposed (multiplied) by the multipliers 401a and the results are output to the higher-hierarchy device coupling/splitting unit 402.

<Higher-Hierarchy Device Coupling/Splitting Unit 402>

For the reception signal, the higher-hierarchy device coupling/splitting unit 402 is configured to split the reception signal and respectively output the split signals to the weight synthesis units 412 corresponding to the plurality of higher-hierarchy devices. For the transmission signal, the higher-hierarchy device coupling/splitting unit 402 is configured to combine the transmission signals from the plurality of weight synthesis units 412 and output the combined signal to the gain normalization unit 401.

<Antenna Controller 410>

The antenna controller 410 includes a plurality of weight units 411, a plurality of weight synthesis units 412, and a plurality of signal coupling/splitting units 413 each corresponding in number to the number of the higher-hierarchy devices.

In addition, each weight synthesis unit 412 includes a plurality of multipliers 412a.

The weight unit 411, the weight synthesis unit 412, and the signal coupling/splitting unit 413 are the same as the weight unit 101, the weight synthesis unit 102, and the signal coupling/splitting unit 103 shown in FIG. 1. The weight synthesis unit 412 is configured to receive a plurality of reception signals from the higher-hierarchy device coupling/splitting unit 413, superpose the weight values on the reception signals, and output the weight value superposed signals to the modulator/demodulator 12 connected to the higher-hierarchy device.

In addition, the weight synthesis unit 412 is configured to superpose the weight values on a plurality of transmission signals split by the signal coupling/splitting unit 413 and output the weight value superposed signals to the higher-hierarchy device coupling/splitting unit 402. The multiplier 412a is configured to superpose the weight values from the weight unit 411 on the transmission/reception signals.

In the weight unit 411, the weight values from the radiation pattern selector 330 of the autonomous controller 300 are set therein and the weight unit 411 outputs the weight values to the multiplier 412a.

The signal coupling/splitting unit 413 combines the weight value superposed reception signals and outputs the combined signal to the modulator/demodulator 12 corresponding to each higher-hierarchy device and splits a modulated transmission signal from the modulator/demodulator and outputs the split signals to the respective multipliers 412a.

In the configuration of FIG. 2, the number of beams generated according to the antenna radiation pattern selected for the arrival direction estimated by the autonomous controller 300 may be adjusted to be the same as the number of higher-hierarchy devices to be connected.

In this case, the weight unit 411, the weight synthesis unit 412, and the signal coupling/splitting unit 413 in the antenna controller 410 are arranged to correspond in number to the number of the beams. In this case, the array of the radiation patterns is controlled such that the number of beams is the same as the number of higher-hierarchy devices to be connected, which will be described below in FIG. 4.

Further, the plurality of higher-hierarchy devices to be connected may correspond to a sector of one base station.

According to the circuit configuration of FIG. 2, even when the number of users is large, a sophisticated radiation pattern corresponding to each higher-hierarchy device may be formed by the weight synthesis unit 412 according to the arrival directions, and the wireless communication quality according to each higher-hierarchy device may be improved.

Figure 3:
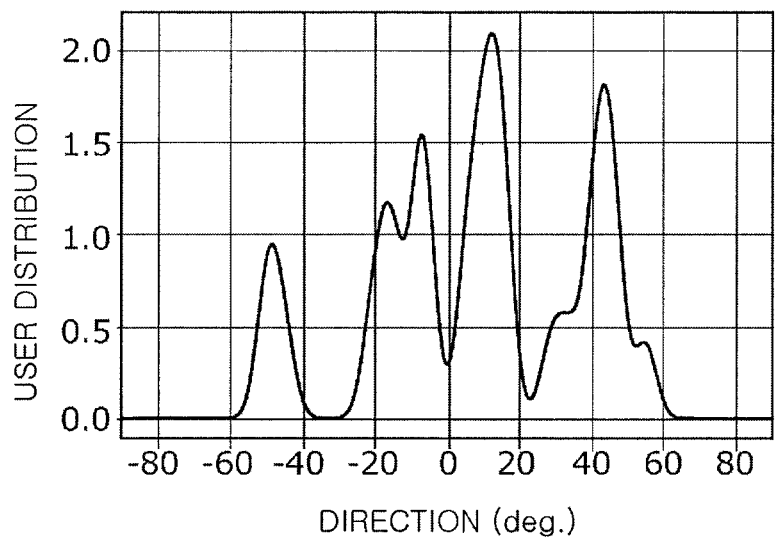
FIG. 3 shows an example of distribution information of direction-of-arrival estimation.

Example of the Distribution Information of Direction-of-Arrival Estimation: FIG. 3

Next, an example of distribution information of the direction-of-arrival estimation will be described with reference to FIG. 3. FIG. 3 shows an example of distribution information of the direction-of-arrival estimation. In FIG. 3, the horizontal axis represents an angle (direction), and the vertical axis represents a probability density (user distribution).

The distribution information of the direction-of-arrival estimation is the sum of adding the frequency of receptions at each arrival angle in the distribution information calculator 320 of the autonomous controller 300.

As illustrated in FIG. 3, a plurality of peaks at each of which the probability density is greater than 0.5 are formed at a plurality of angles, and the plurality of peaks provide distribution information for the direction-of-arrival estimation.

In FIG. 3, the angles at each of which the probability density is great are the arrival directions of the reception signals.

In the example shown in FIG. 3, twenty-nine peak angles associated with levels of the direction-of-arrival estimation obtained by the Capon method are accumulated, and a kernel distribution is obtained using a Gaussian function and used as the distribution information for the direction-of-arrival estimation.

Figure 4:
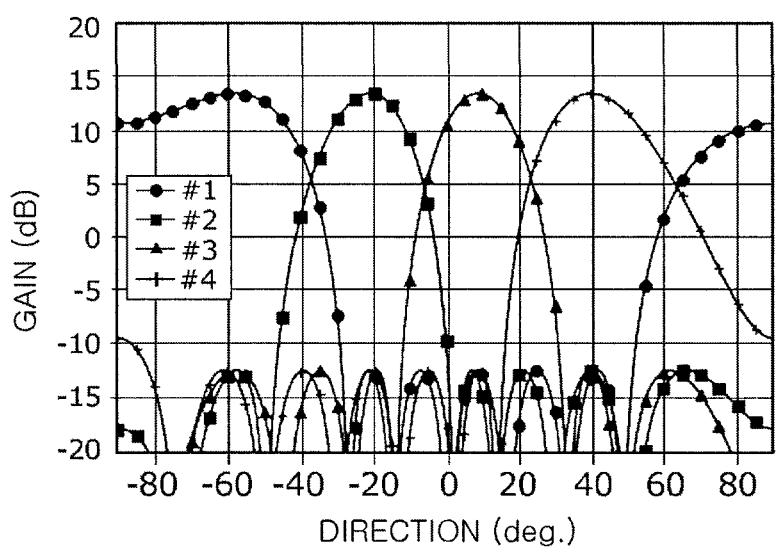
FIG. 4 shows an example of a radiation pattern.

Example of the Radiation Pattern: FIG. 4

Next, an example of a radiation pattern in the antenna control device according to the present embodiment will be described with reference to FIG. 4. FIG. 4 shows an example of a radiation pattern. In FIG. 4, the horizontal axis represents an angle (direction), and the vertical axis represents a gain.

FIG. 4 shows an example in which the number of beams of the radiation pattern is the same as the number of connections of the higher-hierarchy devices, and the number of connections of the higher-hierarchy devices and the number of beams are four.

Further, the radiation pattern may have an initial pattern. The beam pattern shown in FIG. 4 shows a typical example of the initial pattern.

In addition, the radiation pattern controlled by the antenna control device according to the present embodiment is an autonomous radiation pattern that is formed according to the number of connections of the higher-hierarchy devices. When the number of connections of the higher-hierarchy devices is plural, the beams form beam patterns divided to correspond to the number of connections of the higher-hierarchy devices.

In the example shown in FIG. 4, the aerial line 10 includes a linear array antenna having seven arrays, formed of omnidirectional antenna elements, and arranged with half-wavelength spacing.

Example of the Combination of Radiation Patterns: FIG. 5

Next, an example of a combination of radiation patterns in the antenna control device according to the present embodiment will be described with reference to FIG. 5. FIG. 5 shows an example of a combination of radiation patterns when a plurality of higher-hierarchy devices are provided.

FIG. 5 shows an example in which the number of beams of the radiation pattern is the same as the number of connections of the higher-hierarchy devices, and the number of connections of the higher-hierarchy devices and the number of beams are four.

In addition, the combination of radiation patterns corresponding to a pattern number 1 shown in FIG. 5 is a radiation pattern of FIG. 4.

In the example shown in FIG. 5, a beam-directed area is divided into twelve areas from −60 degrees to +60 degrees, and beam patterns, each having four beams distributed for every three blocks (30 degrees), are arranged in a stepwise manner at every 10 degrees in a range of −70 degrees to +70 degrees.

The combination of radiation patterns, each of which is formed of beams arranged as described above, provides a total of fifteen patterns from the pattern number 1 to a pattern number 15.

For example, in the pattern number 1, four beam patterns are arranged to the left, and in the pattern number 2, only the rightmost beam pattern is arranged 10 degrees to the right. In pattern number 3, the rightmost beam pattern is arranged 10 degrees further to the right.

In the pattern number 4, the second beam pattern from the right is arranged 10 degrees to the right in the state of the pattern number 2. In the pattern number 5, the rightmost beam pattern is arranged 10 degrees to the right in the state of pattern number 4.

In this manner, four beam patterns may be prepared in fifteen types of arrangements from −60 degrees to +60 degrees for a beam-directed area.

That is, in FIG. 5, an example of the combination of radiation patterns in which four beam patterns are arranged is illustrated to correspond to the pattern numbers 1 to 15.

When each candidate for a radiation pattern is stored in the radiation pattern selector 330 of the antenna control device according to the present embodiment as a combination of radiation patterns, corresponding weight values are calculated using an algorithm of weight calculation in advance and stored (memorized) in the radiation pattern selector 330.

Figure 6:
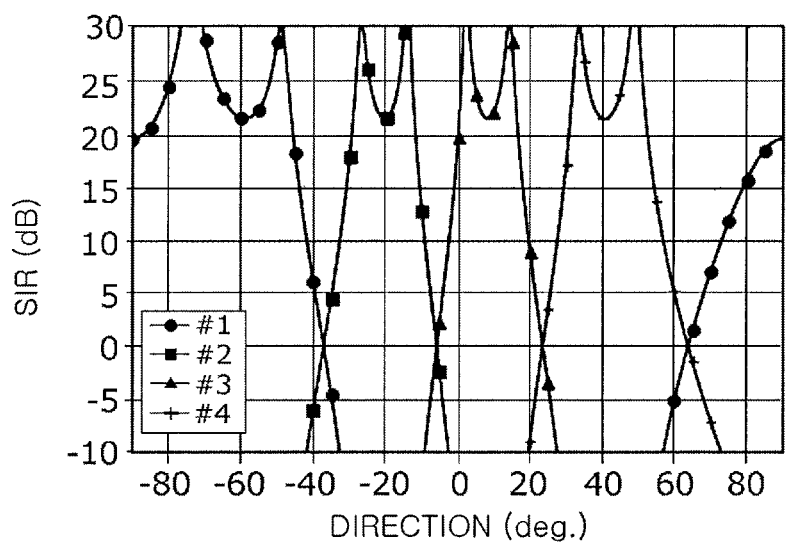
FIG. 6 shows an example of signal quality of a radiation pattern.

Example of the Signal Quality: FIG. 6

Next, an example of the signal quality of the radiation pattern will be described with reference to FIG. 6.

FIG. 6 shows an example of the signal quality of the radiation pattern of FIG. 4. In FIG. 6, the horizontal axis represents an angle (direction), and the vertical axis represents communication quality (SIR).

FIG. 6 shows an example in which the number of beams of the radiation pattern is formed to be the same as the number of connections of the higher-hierarchy devices, and the number of connections of the higher-hierarchy devices and the number of beams are four.

In the example shown in FIG. 6, information about the signal quality is obtained using SIR. Communication quality patterns #1 to #4 shown in FIG. 6 correspond to the beam patterns #1 to #4 in FIG. 4, respectively.

Figure 7:
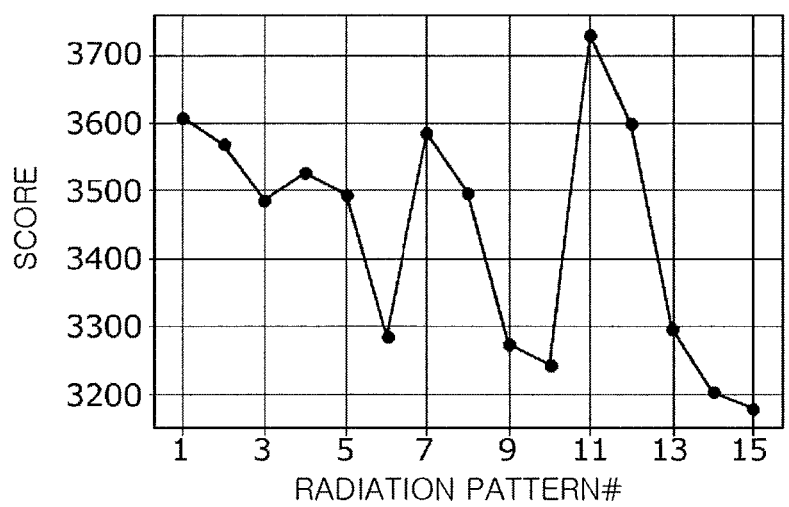
FIG. 7 shows scores of radiation pattern candidates.

Example of the Score of a Radiation Pattern Candidate: FIG. 7

Next, an example of the scores of the radiation pattern candidates will be described with reference to FIG. 7. FIG.

7 shows the scores of radiation pattern candidates. In FIG. 7, the horizontal axis represents a radiation pattern number, and the vertical axis represents a score.

Specifically, FIG. 7 shows an example of a score obtained based on the distribution information of the direction-of-arrival estimation in FIG. 3 and the combination of the radiation patterns in FIG. 5. In the example shown in FIG. 7, the score t of an $i^{th}$ radiation pattern candidate is obtained using Equation 8 as follows:

⟨Equation 8⟩

$$t_i = \sum_{\theta} p(\theta) \times \min\left(\max\left(q_{i,Beam1}(\theta), q_{i,Beam2}(\theta), \ldots q_{i,BeamN}(\theta), 10^{1.5/10}\right), 10^{30/10}\right). \quad (8)$$

Figure 8:
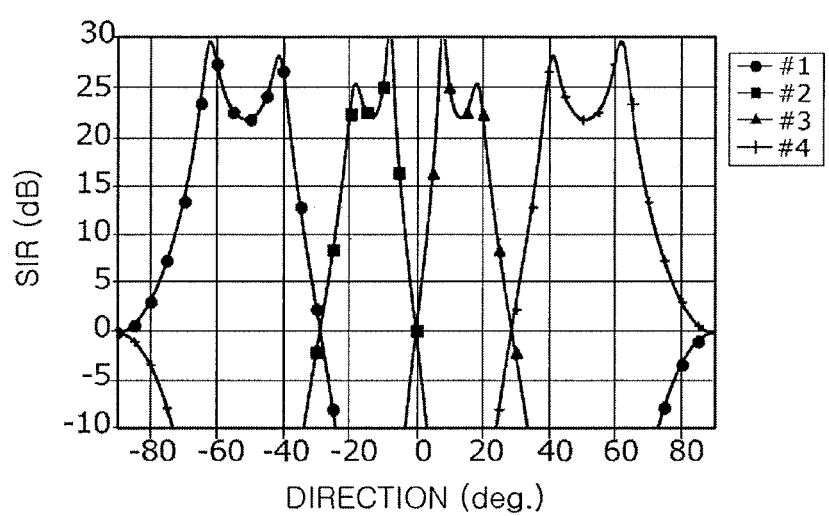
FIG. 8 shows signal quality of an optimal radiation pattern.

Example of the Signal Quality of an Optimal Radiation Pattern: FIG. 8

Next, an example of the signal quality of the optimal radiation pattern will be described with reference to FIG. 8. FIG. 8 shows the signal quality of the optimal radiation pattern. In FIG. 8, the horizontal axis represents an angle (direction) and the vertical axis represents communication quality (SIR).

Specifically, FIG. 8 shows an example of information about the signal quality of the radiation pattern of the pattern No. 11 (see FIG. 5) having the highest score shown in FIG. 7.

In the example shown in FIG. 8, the information about the signal quality is obtained using SIR.

That is, from the communication quality patterns shown in FIG. 6, the radiation pattern of the pattern No. 11 having the maximum score in FIG. 7 is learned, and the corresponding communication quality pattern is shown in FIG. 8.

The communication quality pattern shown in FIG. 8 is a pattern of the communication quality of the radiation pattern selected by the radiation pattern selector 330.

Figure 9:
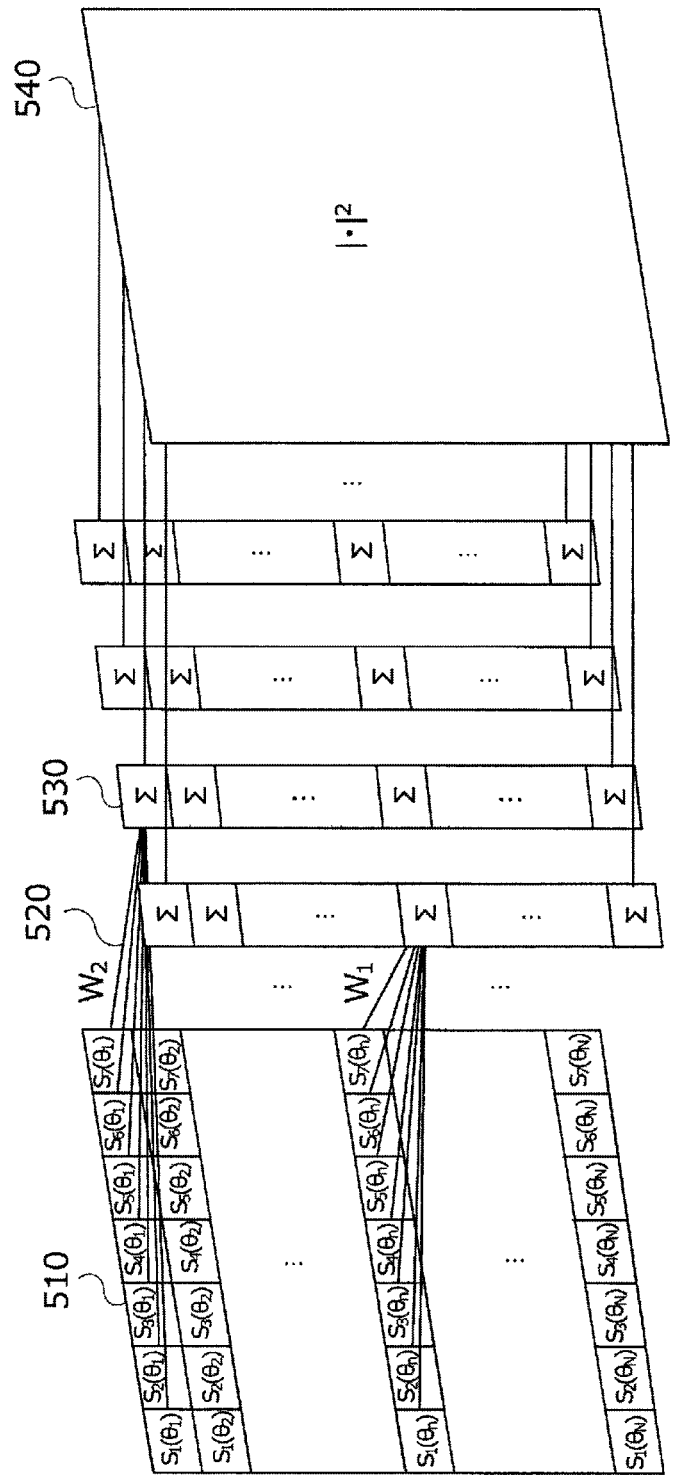
FIG. 9 shows a front stage of a score calculation circuit.
Figure 10:
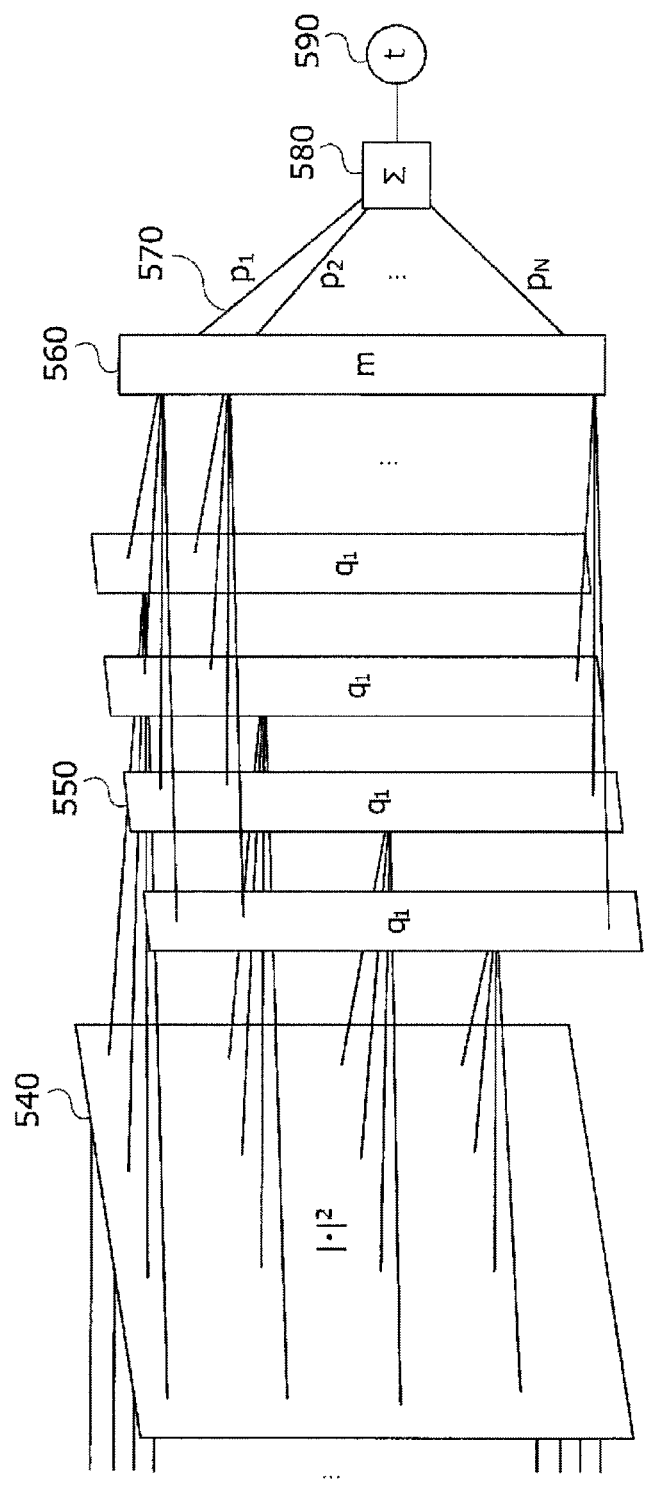
FIG. 10 shows a rear stage of the score calculation circuit.

<Score Calculation Circuit: FIGS. 9 and 10>

Next, a score calculation circuit for calculating a score by the radiation pattern selector 330 based on distribution information from the distribution information calculator 320 will be specifically described with reference to FIGS. 9 and 10. FIG. 9 shows a front stage of the score calculation circuit, and FIG. 10 shows a rear stage of the score calculation circuit. In addition, FIG. 9 continues to FIG. 10, in which an absolute value squared unit 540 overlaps in FIGS. 9 and 10. FIGS. 9 and 10 show an example of the relationship between the weight value and the score. In addition, the score calculation circuit includes the signal quality calculator 340.

The radiation pattern selector 330 and the signal quality calculator 340 may be provided with the score calculation circuit shown in FIGS. 9 and 10.

As illustrated in FIGS. 9 and 10, the score calculation circuit includes a steering vector unit 510, a weight superposition unit 520, a summation unit 530, an absolute value squared unit 540, a signal quality calculator 550, a max pooling unit 560, a distribution information superposition unit 570, a summation unit 580, and a score 590.

<Steering Vector Section 510>

The steering vector unit 510 is configured to output phase information assigned to each antenna 10a of the aerial line 10 with respect to an arrival direction of a reception signal to the weight superposition unit 520. For example, when the number of divisions of the arrival direction of the reception signal is 180 and the number of antennas is 7, 180×7 pieces of phase information are obtained.

<Weight Superposition Unit 520>

The weight superposition unit 520 is configured to superpose weight values of the radiation pattern on the phase information input from the steering vector unit 510 and output the weight value superposed phase information to the summation unit 530. For example, when the number of pieces of phase information is 180×7 and the number of beams of the radiation pattern is 4, 180×7×4 pieces of weight superposed phase information are obtained.

<Summation Unit 530>

The summation unit 530 is configured to calculate the sum of the weight superposed phase information input from the weight superposition unit 520 for each beam and output amplitude information of the radiation pattern for the arrival direction of the reception signal to the absolute value squared unit 540. For example, when the number of pieces of weight superposed phase information is 180×7×4, 180×4 pieces of amplitude information of the radiation pattern is obtained.

<Absolute Value Squared Unit 540>

The absolute value squared unit 540 is configured to calculate the square of the absolute value of each piece of the amplitude information of the radiation pattern input from the summation unit 530 and output the level information corresponding thereto to the signal quality calculator 550.

<Signal Quality Calculator 550>

The signal quality calculator 550 is configured to obtain information about the signal qualities from the level information of the radiation pattern input from the absolute value square part 540 and output the information about the signal qualities to the max pooling unit 560. Since the signal quality calculator 550 is the same as the signal quality calculator 340, a description thereof will be omitted.

<Max Pooling Unit 560>

The max pooling unit 560 is configured to select the maximum signal quality in each arrival direction of the reception signal among the information about the signal qualities input from the signal quality calculator 550 and output the maximum signal quality to the distribution information superposition unit 570.

<Distribution Information Superposition Unit 570>

The distribution information superposition unit 570 is configured to superpose the distribution information of the direction-of-arrival estimation shown in FIG. 3 on the maximum signal quality in each arrival direction of the reception signal input from the max pooling unit 560 to obtain pre-score values P1 to PN and output the pre-score values P1 to PN to the summation unit 580.

<Summation Unit 580>

The summation unit 580 is configured to calculate the sum of the pre-score values P1 to PN corresponding to each radiation pattern (an $i^{th}$ radiation pattern) input from the distribution information superposition unit 570 to obtain the score 590.

<Score 590>

The score 590 obtained for each radiation pattern is the sum of pre-score values obtained by the summation unit 580.

With respect to the score 590 obtained for each radiation pattern, a radiation pattern having the highest score is selected by the radiation pattern selector 330, and weight values for realizing such a radiation pattern are set in the weight unit 101 of the antenna controller 200.

In addition, when the radiation pattern is selected only with the score, a capacity may be limited. Thus, the score may be adjusted by adding the magnitude of the variance of the sub-scores.

Although FIGS. 9 and 10 show the score calculation circuit provided in the radiation pattern selector 330 and the signal quality calculator 340 of the autonomous controller 300, the score calculation circuit may be provided separately from the radiation pattern selector 330 and the signal quality calculator 340 or may also be configured as a part of the circuit of the antenna control device.

In addition, the score calculation circuit may include circuits of other configurations. For example, a nonlinear function may be applied to a rear stage of the max pooling unit 560.

The score 590 is provided as a part of the circuit configuration of the antenna control device shown in FIGS. 9 and 10 and is uniquely obtained from the weight values and the distribution information of the direction-of-arrival estimation.

When the distribution information of the direction-of-arrival estimation is provided as input and the score 590 is provided as output, the weight values that maximize the output may be obtained by a known learning algorithm. Genetic algorithms, simplex methods, and well-known gradient methods are preferred, and any one of the genetic algorithms, simplex methods, and well-known gradient methods may be employed.

Figure 11:
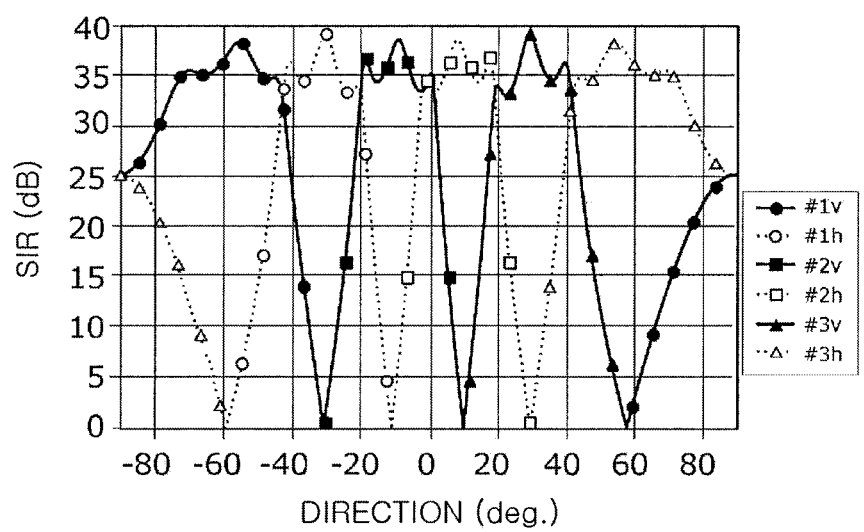
FIG. 11 shows an example of signal quality when the antenna control device according to the embodiment is applied to a polarization multiplexing wireless system.

Example of Signal Quality with Polarization Multiplexing Wireless System: FIG. 11

Next, an example of the signal quality in a case in which the antenna 10a is a polarization shared antenna and a wireless system employing the antenna control device according to the present embodiment performs polarization multiplexing will be described with reference to FIG. 11. FIG. 11 shows an example of the signal quality when the antenna control device according to the present embodiment is applied to a polarization multiplexing wireless system. In FIG. 11, the horizontal axis represents an angle (direction) and the vertical axis represents communication quality (SIR).

FIG. 11 shows an example in which the number of beams of the radiation pattern of each polarization is the same as the number of connections of the higher-hierarchy devices, and the number of connections of the higher-hierarchy devices and the number of beams of each polarization are three.

The antenna 10a may be provided individually for each polarization.

In a polarization multiplexing reception signal of vertical polarization (v) and horizontal polarization (h), when a certain degree of cross-polarization discrimination (XPD), for example, 10 decibels of XPD, is secured, transmission signals of the vertical polarization and the horizontal polarization may be separated and restored by providing a higher-hierarchy device with a polarization interference cancellation (XPIC) method.

Therefore, in a direction in which the signal quality of the radiation patterns of the vertical polarization and the horizontal polarization is low, the radiation patterns are generated to complement each other, thereby forming an area having high signal quality in a broad range. For the polarized multiplexing, a right circle polarization or a left circle polarization may be used.

In the generation of the radiation pattern, as described above, a radiation pattern may be selected from the combination of radiation patterns, an optimal radiation pattern having the highest score with respect to distribution information may be selected, or weight values at which the score is maximized may be obtained by a known learning algorithm.

In addition, the antenna control device according to the present embodiment may be applied to a wireless system of polarized multiple-input multiple-output (MIMO) by overlapping a radiation pattern of vertical polarization and a radiation pattern of horizontal polarization.

In the example shown in FIG. 11, the signal quality information is obtained using SIRs of a beam of vertical polarization and a beam of horizontal polarization.

Effects of the Embodiment

The antenna control device according to the present embodiment includes the weight unit 101 in which weight values to be superposed on transmission/reception signals are set to form radiation patterns using the plurality of antennas 10a; the weight synthesis unit 102 configured to superpose the weight values from the weight unit 101 on the transmission/reception signals; the arrival direction detector 310 configured to detect arrival directions of the reception signals; the distribution information calculator 320 configured to calculate distribution information of the detected arrival directions; the signal quality calculator 340 configured to calculate signal quality information of each of the radiation patterns; and the radiation pattern selector 330 configured to select a radiation pattern on the basis of the distribution information and the signal quality information of the radiation pattern, and set the weight values corresponding to the selected radiation pattern in the weight unit 101. With such configuration, the weight values are easily set to generate an appropriate radiation pattern according to a wireless environment.

Further, according to the antenna control device, in a system for generating an antenna radiation pattern for effectively constructing an area in an environment where a large number of users exist, a user distribution state can be autonomously identified and an optimal antenna radiation pattern can be generated without performing environmental inspection in advance or having an adjustment from a higher-hierarchy device according to an environmental change.

In addition, according to the antenna control device, since the signal quality of the radiation pattern is directly evaluated, the optimal antenna radiation pattern can be generated using a small number of antennas 10a in which the gain of the radiation pattern and the signal quality of the radiation pattern are not evaluated in an approximate method.

In addition, according to the antenna control device, one antenna control device operates in a manner connected to a different higher-hierarchy device for each beam so that the communication quality can be ensured even in an environment in which a large number of users exist and one higher-hierarchy device has insufficient capacity.

In addition, according to the antenna control device, in an environment where many reflections occur, such as in an indoor environment, and multi-paths are formed, the cross-correlation between the paths is checked in a process of identifying the user distribution situation, and only the maximum path among the multi-paths is stored the arrival direction in statistical information, so that an appropriate distribution situation can be identified.

Further, according to the antenna control device, beams are independently controlled for a plurality of base stations or a plurality of sectors of a base station so that a harmonious radiation pattern is generated as a whole, thereby realizing improvement of the communication quality by area division of a radio area while increasing the capacity of the base station side of each divided area.

In this case, the beams are autonomously controlled to be generated to correspond in number to the number of base stations or sectors to be connected, thereby enabling efficient operation.

INDUSTRIAL APPLICABILITY

The present invention is suitable for an autonomous radiation pattern generation antenna control device for generating a plurality of autonomous radiation patterns by setting weight values so as to generate an appropriate radiation pattern for a plurality of areas according to a wireless environment, and a control method therefor.

EXPLANATION OF REFERENCE NUMERALS

10: aerial line
10a: antenna
11: wireless unit
11a: TRX
11b: AD/DA
12: modulator/demodulator
100, 200, 410: antenna controller
101, 411: weight unit
102, 412: weight synthesis unit
103, 413: signal coupling/splitting unit
200: antenna controller
300: autonomous controller
310: arrival direction detector
320: distribution information calculator
330: radiation pattern selector
340: signal quality calculator
401: gain normalization unit
401a: multiplier
401b: gain providing unit
402: higher-hierarchy device coupling/splitting unit
412a: multiplier
510: steering vector unit
520: weight superposition unit
530: summation unit
540: absolute value squared unit
550: signal quality calculator
560: max pooling unit
570: distribution information superposition unit
580: summation unit
590: score

What is claimed is:

1. An antenna control device including an antenna controller configured to set weight values to be superposed on transmission/reception signals to form radiation patterns using a plurality of antennas and superpose the weight values on the transmission/reception signals, the antenna control device comprising:
    an arrival direction detector configured to detect arrival directions of the reception signals;
    a distribution information calculator configured to calculate distribution information of the detected arrival directions;
    a signal quality calculator configured to calculate signal quality information of each of the radiation patterns; and
    a radiation pattern selector configured to select a radiation pattern on a basis of the distribution information and the signal quality information and set the weight values corresponding to the selected radiation pattern in the antenna controller,
    wherein the arrival direction detector repeats a process of estimating angles of the arrival directions of the reception signals a specific number of times,
    the distribution information calculator accumulates information related to reception levels at the angles of the arrival directions of the reception signals estimated through the repeated estimation and calculates distribution information of the arrival directions of the radio waves from the accumulated information,
    the signal quality calculator calculates signal quality information of each of candidates for the radiation pattern, and
    the radiation pattern selector selects, among the candidates, the radiation pattern that has a highest value obtained by adding a magnitude of a variance of sub-scores for respective beams in each of the candidates for the radiation pattern to a score obtained by superposing the distribution information of the arrival directions on each of the candidates for the radiation pattern according to the signal quality information and performing summation on each of the distribution information superposed candidates.

2. The antenna control device of claim 1, wherein the plurality of antennas are polarization-shared antennas and each of a vertical polarized radiation pattern and a horizontal polarized radiation pattern is selected.

3. A method of controlling an antenna control device including an antenna controller configured to set weight values to be superposed on transmission/reception signals are set to form radiation patterns using a plurality of antennas and superpose the weight values on the transmission/reception signals, the method comprising:
    detecting arrival directions of the reception signals;
    calculating distribution information of the detected arrival directions;
    calculating signal quality information of each of the radiation patterns; and
    selecting a radiation pattern on the basis of the distribution information and the signal quality information and setting the weight values corresponding to the selected radiation pattern in the antenna controller,
    wherein, in the detecting of the arrival directions, a process of estimating angles of the arrival directions of the reception signals is repeated a specific number of times,
    in the calculating of the distribution information, information related to reception levels at the angles of the arrival directions of the reception signals estimated through the repeated estimation are accumulated and distribution information of the arrival directions of the radio waves is calculated from the accumulated information,
    in the calculating of the signal quality information, signal quality information of each of candidates for the radiation pattern is calculated; and
    in the selecting of the radiation pattern,
    the radiation pattern that has a highest value obtained by adding a magnitude of a variance of sub-scores for respective beams in each of the candidates for the radiation pattern to a score obtained by superposing the distribution information of the arrival directions on each of the candidates for the radiation pattern according to the signal quality information and performing summation on each of the distribution information superposed candidates is selected among the candidates.

4. The method of claim 3, wherein the plurality of antennas are polarization-shared antennas and each of a vertical polarized radiation pattern and a horizontal polarized radiation pattern is selected.

5. A wireless communication system comprising:

the antenna control device described in claim 1; and a plurality of higher-hierarchy devices, wherein the antenna controller includes weight units in each of which the weight values to be superposed on the transmission/reception signals are set to form the radiation patterns using the plurality of antennas and weight synthesis units each of which is configured to superpose the weight values on the transmission/reception signals, and the number of weight units and the number of weight synthesis units are the same as the number of the higher-hierarchy devices, and coupling/splitting units for coupling or splitting signals are provided between the weight synthesis units and the higher-hierarchy devices, respectively.

* * * * *